March 28, 1944.   A. H. REIBER   2,345,289
PRESSURE BOOSTER APPARATUS
Filed Sept. 20, 1941
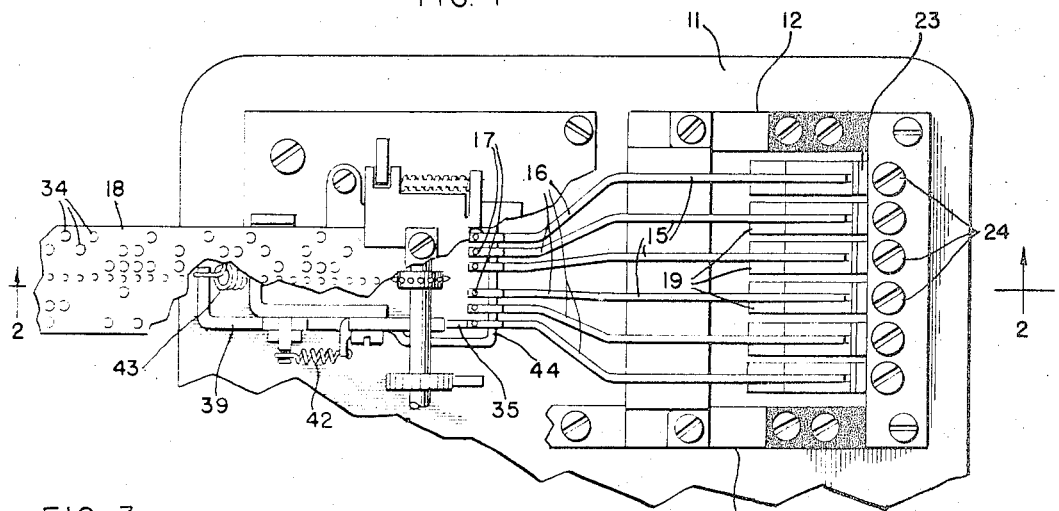
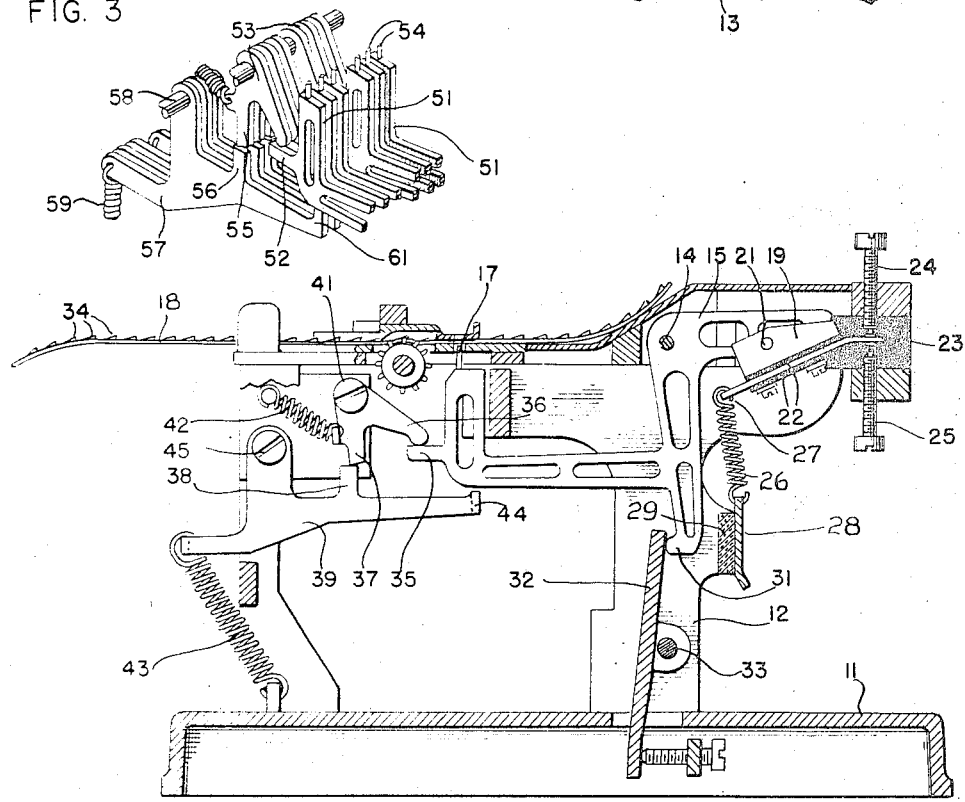
INVENTOR.
ALBERT H. REIBER
BY *J. H. B. Whitfield*
ATTORNEY.

Patented Mar. 28, 1944

2,345,289

UNITED STATES PATENT OFFICE 2,345,289

PRESSURE BOOSTER APPARATUS

Albert H. Reiber, Evanston, Ill., assignor to Teletype Corporation, Chicago, Ill., a corporation of Delaware Application September 20, 1941, Serial No. 411,654

7 Claims. (Cl. 178—17)

The present invention relates to telegraph transmitting apparatus and more particularly to control form sensing mechanism as applied thereto.

In automatic telegraph transmission systems, code signals are made upon a perforated tape by providing various transverse permutations of apertures in accordance with a code and thereafter a set of sensing elements is simultaneously applied against the transverse alignments successively to determine the nature of the signals which are then translated into corresponding electrical code signals comprised of combinations of varying electrical impulses. Sometimes, the control forms instead of being provided with circular perforations in each signal impulse position are provided with partial-circular cutout portions leaving minutely connected tabs which cover the openings.

As a further advance, it has been suggested as, for example, in the W. M. Bacon Patent No. 2,246,655, that consecutive ends of control forms may be spliced together by projecting the tabs of one form end through the openings of another form end, effecting thereby a continuous form that may be fed uninterruptedly through tape sensing apparatus instead of requiring that each succeeding length of tape be independently threaded through the apparatus. In following this practice, however, it was noted that there is produced a double thickness region in the vicinity of the splice where the afore-mentioned tabs coincide one above the other constituting themselves an increased resistance to the normal passage of the tape feeler apparatus. While ordinarily the message portion of a control form is not thereby distorted since the tape is not doubled in thickness except at the splice region which is customarily provided with all-marking (holes in all positions) signals. The increased resistance to the tape feelers performing under conventional operating conditions has been found to impede the movement of the tape feelers or sensers to an extent that there may result occasional failures of the tape sensing levers in pivoting fully and projecting their pins through the double lidded apertures in the region of the splice, thereby producing a likelihood of false signals. That is to say, instead of each senser recording as upon encountering a perforation and effecting a marking signal, the impediment resists certain ones of the sensing levers and, blocking them, manifests instead a false character signal.

To avoid these occurrences, it is herewith proposed to provide, in conjunction with tape sensing mechanism, auxiliary booster apparatus having supplemental spring pressure means powerful enough to overcome the resistance encountered by the feeler levers when sensing double lidded conditions characteristic of the tape splice region. This auxiliary or booster assistance which is thereby afforded to the tape feelers, permits them to enter fully into perforations notwithstanding that double lids may be encountered thereat and to thereby assure the proper response of the signaling mechanism in contrast with the possibility of producing false signals as afore-explained. Where control forms are prepared from relatively stiff ribbon material as is sometimes done in order to obtain a more lasting perforated record, the resistance of the relatively unlimber lidded portions of the perforated forms may be a sufficient factor to constitute a substantial degree of resistance to the operation of the tape sensing apparatus; accordingly, the utility of the present device may have application to other conditions than the first stated one concerning the tape splice region.

Accordingly, the principal object of the present invention is the provision of a tape sensing apparatus having auxiliary force application to assist the tape sensing elements in the performance of their signal probing duties when their probing movement may be partially resisted as by unlimber control form characteristics.

The manner in which these and other objects are attained in accordance with the provisions of the present invention will now be described with particular reference to the accompanying drawing, whereas in the following detailed specification like reference characters designate corresponding parts throughout, and where:

Fig. 1 is a plan view of a typical tape sensing apparatus having the principles of the present invention applied thereon;

Fig. 2 is a transverse sectional view taken approximately on line 2—2 of Fig. 1; and Fig. 3 is a detailed perspective view of a modified form of apparatus having applied thereto the principles of the present invention.

On the accompanying drawing the reference character 11 designates a base casting of a telegraph apparatus such as a tape transmitter which supports a pair of side frames 12 and 13, which afford end support to a principal pivot shaft 14 upon which is rotatably mounted a set of pivot levers 15. The foremost ends of the several pivot levers 15, six in the instant embodiment, are bent inwardly in various degrees as best indicated at 16, Fig. 1, so as to bring their extremities more nearly together and so as to correspond to the width of the control form material 18. A feeler pin 17 which is carried upon the uppermost extremity of each one of the feeler levers 15 is of sufficient length so as to extend through the perforations in the control form or tape 18 when its associated lever 15 is in its extreme clockwise position. An individual contact carrying block 19 pivoted at 21, each upon an associated one of the feeler levers 15, carries between the insulation plates 22 a contactor strip 23 upon whose extremity there is provided a double surfaced contact point that may engage with one or the other of a pair of opposed contact screws 24 or 25.

A spring 26 individual to each contactor and feeler lever assembly is preferably soldered as at 27 to its associated contactor 23 and is secured to an individual contact plate 28 mounted along with other and similar contact plates 28 upon an insulation terminal block 29. To these plates 28 there may be secured as by soldering, the impulse channel wires which communicate with a signal distributor apparatus such as a rotary segmented distributor commonly used in telegraph transmission systems. The individual springs 26 not only function as electrical conductors for extending their respective circuit connections to their associated contactor strips 23 but also they exert a counterclockwise force upon the contact blocks 19 and through them a similar force upon their associated levers 15, tending to maintain said levers in their extreme clockwise position as concerns their pivots 14. This movement clockwise on the part of the several sensing levers 15 is prevented when their abutment extremities 31 engage the common operating bail 32. When the common operating bail 32 is situated in the position illustrated in Fig. 2, namely, its clockwise extreme position with respect to pivots 33, all of the levers 15 are so disposed that their contactor tongues 23 engage the uppermost ones of the contact screws 24 and their sensing pins 17 are retracted so as not to engage the perforated control form 18.

On the other hand, when such common bail 32 is in its opposite position, namely, having moved counterclockwise through a limited angle about pivot 33 as is urged by a main operating cam (not shown), the several levers 15 will respond to the urge of their individual springs 26 and will extend or attempt to extend their sensing pins 17 upwardly against or through the tape 18 at the same time tending to move their contactors 23 against the lowermost contact screws 25, Fig. 2.

Since it is especially intended that the apparatus under study be operated with the type of control form illustrated in Figs. 1 and 2 having the articulated tabs 34, as distinguished from having the thoroughly cutout perforations, and since in accordance with the preferred practice the articulated tabs 34 are sometimes doubled as where they are utilized in the performance of a splicing connection between two contiguous ends of tape 18, a situation sometimes arises where the resistance by the tabs 34 to the insertion of the sensing lever pin 17 is great enough to equal or overcome the effect of the individual springs 26, so that the levers 15 may thereby be prevented from exercising their full clockwise rotation about pivot 14 and also thereby withholding their contactors 23 from engagement with the lowermost contact screws 25. Under these circumstances, the mere increasing of the force of springs 26 is not deemed to be a satisfactory solution for all conditions of operation since the pressure thereby obtained on the part of levers 15 may, when the apparatus is used with a thin material control strip 18, cause the pins 17 to act as perforators and make holes in the tape where no such holes are intended. It is accordingly necessary to provide a means which will in its application of the pins to the tape 18 be gentle enough to prevent the inadvertent puncturing of the tape 18 while yet be strong enough to overcome the resistance encountered by the use of heavy tape material 18 or by the use of multiple lidded regions 34 such as where a splice has been made.

This is accomplished by mechanism now to be described which permits the feeler levers 15 to function initially under the influence of their normal or mild springs 26 but which upon encountering a perforation which yields but partially to the influence of the feeler levers 15, causes to be released an auxiliary mechanism which applies additional force supplementing that of the springs 26 but in those instances only where perforations have been definitely discovered by the initial operation of the principal springs 26.

In the embodiment portrayed in Figs. 1 and 2, one only of the set of feeler levers is provided with an auxiliary portion 35 which extends beneath one arm 36 of a bell crank lever whose other arm 37 is square shouldered and blocks an upstanding projection 38 of a lever 39. The one feeler lever 15 which is thus provided with the afore-mentioned projection 35 is adapted to follow the control form 18 with its sensing pin 17 at one edge thereof whereat a perforation is made simultaneously with the all-marking signal. If preferred, or where a narrower tape than six-unit tape is utilized in the transmission of five-unit code combination signals, there may be provided a marginal cutout coincident with the splice area in the tape accompanying all-marking signals so that the special feeler 15 will encounter the afore-mentioned cutout and will be permitted to rise coincident with its occurrence, which as has been explained, will correspond with the tape splicing region. The upward movement of the special feeler lever carrying with it projection 35 causes the rocking in a counterclockwise direction of bell crank lever 36—37 about its pivot 41 since the effect of spring 26 through feeler lever 15 is sufficient to overcome relatively mild spring 42 which normally maintains bell crank 36—37 in its clockwise position.

As a result, blocking arm 37 is withdrawn from the path of upstanding projection 38, permitting lever 39 under the influence of its relatively powerful spring 43 to rotate counterclockwise applying its transverse bar section 44 beneath the horizontal arms of all of the feeler levers 15, lifting them upwardly in supplement to the force applied by their individual springs 26.

Thereafter, when the common bail 32 is rocked clockwise by a cyclically operative instrumentality (not shown) such as a rotating cam, all of the feeler levers 15 including the special feeler lever which has the integrally associated projection 35, will be rotated counterclockwise about pivot 14. Thereafter, the horizontally extending arms of the feeler levers will engage the transverse bar 44 of lever 39 and will rotate the latter member clockwise about its pivot 45 until bell crank lever 36—37 under the influence of its spring 42 will again resume its blocking position as illustrated in Fig. 2.

In the foregoing described adaptation there is contemplated a record sensing apparatus which is especially designed to overcome the physical resistance incurred as a result of the practice of tape splicing where the lidded portions 34 become disposed in doubled alignment for a limited length of tape. As was explained above, the present invention is adapted to be applied to other circumstances of physical impediments to tape sensing, and to assist feeler levers in overcoming such resistances. Where the material from which the tape is of heavier than ordinary thickness, means are provided to apply the auxiliary mechanism so as to affect each sensing lever individually, and toward this purpose a somewhat different adaptation is illustrated in Fig. 3.

Here the ends of a six unit feeler lever assembly are designated by the reference character 51. The general contour of these elements may be identical with that of the feeler levers 15 discussed above, except that in this adaptation each lever extremity 51 is provided with one of the sidewardly extending projections here designated 52. The performance of the record reader mechanism is otherwise the same as that described above in connection with Figs. 1 and 2, but since each feeler lever may encounter a resistance or impediment to its upward movement while its adjacent one may not be sensing a perforated condition in the tape, it is necessary that a complete set of individual blocking levers 53 be provided, one for each lever.

Accordingly, when any one of the feeler levers 51 thrusts its sensing pin 54 against the tape 18 and thereat encounters a perforation at the same time being unable for any reason to overcome the physical resistance of the attached lid 34, its projection 52 will move upwardly notwithstanding said resistance to a sufficient extent to rotate bell crank 53 individually associated with it in a counterclockwise direction, Fig. 3, to remove the downwardly extending arm 55 thereof from the path of an upstanding projection 56. Thereupon, an individual lever 57 associated with bell crank 53 will be permitted to rotate counterclockwise about a common shaft 58 under the influence of a spring 59 which in this instance is individual to each one of the levers 57 and by means of the auxiliary force afforded by said individual spring 59 in moving said lever 57 counterclockwise, the remote extremity of said lever 57 will through its projection 61 thrust upwardly against said feeler lever 51, giving it additional force to overcome the resistance.

It is to be observed in this connection that in accordance with the arrangement of elements illustrated in Fig. 3, means have been provided for supplying an auxiliary or booster action for each lever 51 independently of its adjacent levers. This embodiment thereby distinguishes from the arrangement illustrated in Figs. 1 and 2 where under the control of the special lever 16 indicated in Fig. 2 in the foreground, all of the other levers 16 collectively are afforded a booster action by the common bail bar 44 of the single booster lever 39.

While the present invention has been explained and described in contemplation of the specific embodiment, it is to be understood nevertheless that numerous variations and departures may be made without digressing from the essentials of the present invention. Accordingly, it is not intended to be limited by the particular illustrations of the accompanying drawing nor by the detailed description in the foregoing specification except as indicated in the hereunto appended claims.

What is claimed is:

1. A pressure augmenting device for tape sensing apparatus comprising, a set of feeler levers each having spring means for urging it into engagement with a perforated form, an auxiliary lever including means for applying additional force to said set of sensing levers, and a trip means releasable by the initial movement of one of said feeler levers for releasing for operation said auxiliary lever.

2. A record reader apparatus for telegraph transmitting machines comprising, a pivoted tape sensing element, spring means for urging said element into engagement with a record bearing form, cyclically operated means for withdrawing said element from said form in opposition to said spring means, an auxiliary spring means, and a trigger element releasable upon the initial movement of said tape sensing element for operating said auxiliary spring means to augment said first mentioned spring means in the movement of said sensing element.

3. In a tape sensing mechanism, a set of tape feelers, a set of triggers, spring means for urging said tape feelers into engagement with the perforations in a tape, and means under the control of said triggers for supplementing said urging means.

4. An apparatus for probing areas in a supervisory form including a pin, a first spring means of relatively lower tension for urging said pin into engagement with said form cyclically, a second spring means of relatively stronger tension for urging said pin into engagement with said form, and trip means controlled by said pin in response to a movement urged by said first spring means for releasing the force of said second spring means.

5. A device for tape sensing apparatus comprising a set of feeler levers each having lower tension spring means for urging it into engagement with a perforated form, an auxiliary operating spring means exerting a greater force than that of said lower tension means for said set of sensing levers, and a trip releasable by said sensing levers for releasing for operation said auxiliary operating spring means.

6. In a control form transmitting machine, a pivoted tape sensing element, mild pressure means for urging said element into engagement with a form, supplemental stronger pressure means, and a trigger element releasable upon the initial movement of said tape sensing element in response to said mild pressure means for releasing said supplemental pressure means in the operation of said sensing element.

7. In a control form sensing mechanism, a set of feelers, a set of triggers released by the movement of said feelers, spring means for urging said feelers into engagement with the perforations in a control form, and means under the control of said triggers when released by said feelers for supplementing said urging means in forcing said feelers against the form.

ALBERT H. REIBER.